United States Patent [19]
Enari et al.

[11] Patent Number: 5,220,425
[45] Date of Patent: Jun. 15, 1993

[54] IMAGE PROCESSING APPARATUS AND METHOD HAVING IMPROVED CONTROL OF PLURAL IMAGE MEMORIES

[75] Inventors: Masahiko Enari, Yokohama; Ikuo Watanabe, Kawasaki; Motokazu Kashida, Musashino, all of Japan

[73] Assignee: Canon Kabushiki Kaisha, Tokyo, Japan

[21] Appl. No.: 680,064

[22] Filed: Apr. 3, 1991

[30] Foreign Application Priority Data

Apr. 4, 1990 [JP] Japan .................................. 2-88181

[51] Int. Cl.⁵ ...................... H04N 5/14; H04N 5/268; H04N 9/79
[52] U.S. Cl. .................................. 358/160; 358/181; 358/310; 358/339; 360/9.1; 360/36.2
[58] Field of Search ............... 358/160, 181, 149, 188, 358/142, 147, 311, 313, 310, 312, 335, 339, 320, 183, 22, 22 C; 360/9.1, 14.1, 14.3, 10.1, 10.2, 10.3, 33.1, 35.1, 36.2

[56] References Cited

U.S. PATENT DOCUMENTS

| | | | |
|---|---|---|---|
| 4,007,486 | 2/1977 | Inaba et al. | 358/13 |
| 4,231,063 | 10/1990 | Ito et al. | 358/148 |
| 4,388,645 | 6/1983 | Cox et al. | 358/147 |
| 4,470,079 | 9/1984 | Tsuruta | 360/10.2 |
| 4,698,676 | 10/1987 | Kubota et al. | 358/140 |
| 4,862,269 | 8/1989 | Sonoda et al. | 358/160 |
| 5,047,857 | 9/1991 | Duffield et al. | 358/183 |

FOREIGN PATENT DOCUMENTS 2098021 11/1982 United Kingdom ................ 358/141

Primary Examiner—James J. Groody
Assistant Examiner—Safet Metjahic
Attorney, Agent, or Firm—Fitzpatrick, Cella, Harper & Scinto

[57] ABSTRACT

Image data is stored in a plurality of image memories each capable of storing at least one picture of image information, and the plurality of image memories are successively read and their stored images displayed. Ordinarily, the received image data is stored in whichever of the image memories has been designated by a memory number information contained in control data provided along with the received image data. However, when the memory number designated by the control data and the memory number information of an image memory whose stored data is currently being read out and displayed coincide, the writing of the image data in the image memory information whose number has been designated is prohibited. Instead, the image data is written in an image memory whose memory number differs from that of an image memory from which the data is currently being read.

14 Claims, 6 Drawing Sheets

|  | STUDIO PICTURE QUALITY | DESTRIBUTION QUALITY |
|---|---|---|
| NUMBER OF SCANNING LINES | 1,125 LINES | 1,125 LINES |
| BRIGHTNESS BAND (Y) | 30 MHz | 30 MHz |
| BRIGHTNESS SAMPLING FREQUENCY | 74.25 MHz | 48.6 MHz |
| COLOR-DIFFERENCE BAND (PB, PR) | 15 MHz | 7 MHz |
| COLOR-DIFFERENCE SAMPLING FREQUENCY | 37.125 MHz | 16.2 MHz |

FIG. 2

IMAGE PROCESSING APPARATUS AND METHOD HAVING IMPROVED CONTROL OF PLURAL IMAGE MEMORIES

BACKGROUND OF THE INVENTION

1. Field of the Invention

This invention relates to an image processing method and apparatus and an image display method and apparatus and, more particularly, to an image display method and apparatus for restoring and reproducing an image from a received image signal.

2. Description of the Prior Art

Various television broadcast systems have become available and put into practical use in recent years. These include an NTSC system having an aspect ratio of 3:4 and 525 scanning lines, as well as television systems having a higher definition, such as an HDTV system having 9:16 and 1,125 scanning lines. In comparison with the NTSC system, the HDTV system involves about five times as much image information and has a wider screen. For these reasons, the HDTV system is advantageous in that an observer can enjoy a high-resolution, realistic picture.

However, there are limits upon the broadcast radiowave band and communication capacity. Consequently, when there is a large amount of information per frame, as in the case in the HDTV system, it is impossible to transmit this amount of information to a home directly. Accordingly, the information is transmitted upon being subjected to band compression using so-called distribution quality as a standard. This distribution quality is one in which the original picture quality obtained by TV photography at the studio is slightly reduced (i.e., in which the band is lowered).

FIG. 2 is a diagram showing one example of factors involved in such HDTV type studio picture quality and distribution quality. It will be appreciated from this diagram that the high quality of a picture of the kind provided by the HDTV system must be adopted as the distribution quality in order to fully enjoy it as a moving picture in the home. Since the HDTV system has a large number of scanning lines, is very fine and presents very little flicker, use thereof in the field of animation or the like is expected.

Generally, in case of a still picture, the viewer observes a single picture thoroughly for several seconds to several tens of seconds, and therefore picture quality equivalent to that at the studio is required. Besides an HDTV moving-picture display apparatus, an HDTV still-picture display apparatus has been provided and makes it possible to enjoy still pictures of studio quality.

This HDTV still-picture display apparatus has several frame memories. A received image is stored in whichever frame memory is designated from the transmitting side, and images are displayed by changing over from one frame memory to the next.

However, in this example of the prior art, the transmitting side transmits images upon absolutely designating addresses of the frame memories in the apparatus on the receiving side. Therefore, in a case where an image from one transmitting side is selected by channel changeover during reception of one program among programs sent from another transmitting side, or in a case where an image is replayed in mid-course as by a tape rewind operation when the image is being received while transmission data already stored on a video tape or the like is played back, there is the possibility that writing of data in a frame memory whose stored data is currently being displayed may be designated by the next item of image data, as a result of which new image information may be written in this frame memory. In cases such as these, the content of this frame memory will be rewritten while the image stored in this frame memory is being displayed. This means that the condition of the image in the course of being rewritten is displayed, thus resulting in an unattractive picture in which the image can be seen to temporarily dissolve or break down. Such problems are not limited to the aforementioned television broadcast systems, they happen to arise for other various system, e.g. video telephone and video conference and so on.

SUMMARY OF THE INVENTION

Accordingly, an object of the present invention is to provide an image display method and apparatus wherein an unattractive picture in which the image can be seen to temporarily dissolve or break down is not displayed when the image data is rewritten.

Another object of the present invention is to provide an image display method and apparatus in which, during reception of one program from among a plurality of transmitting sides, the picture currently being displayed will not be disturbed even if writing of new image information in the frame memory whose stored image is currently being displayed is designated as by switching a channel.

A further object of the present invention is to provide an image display method and apparatus in which, during reception of one program from among a plurality of transmitting sides, the picture currently being displayed will not be disturbed even if writing of new image information in a frame memory whose stored image is currently being displayed is designated when replay is performed in mid-course during playback of video data.

According to the present invention, the foregoing object is attained by providing an image display method for displaying a received image signal upon storing the image signal in any of a plurality of frame memories, comprising a step of receiving the image signal, which includes control data, and separating it into the image signal and the control data, a step of decoding the separated image signal and converting it into image data, and when the decoded image data is stored in any of the plurality of frame memories, a step of writing the image data in a frame memory whose number is different from a number designated by the control data when the number designated by the control data and the number of the frame memory whose stored image is currently being displayed coincide.

An image display apparatus according to the present invention comprises a plurality of image memories each capable of storing at least one frame of image information, reading means for successively reading the plurality of image memories, comparing means for comparing a memory number, which is contained in control data provided along with received image data, with a memory number of an image memory being read by the reading means, writing means for writing the received image data in an image memory designated by the memory number contained in the control data, and control means for performing control so as to inhibit writing by the writing means when the two memory numbers compared by the comparing means coincide, and to permit writing of the image data by the writing means in an image memory whose memory number differs from the memory number contained in the control data.

Thus, in accordance with the arrangement described above, the memory number of an image memory designated from the transmitting side is compared with the memory number of the image memory whose stored image is currently being displayed. When it is determined that the two memory numbers coincide, the memory number designated from the transmitting side is changed and the received image data is stored in the memory having the changed number.

Other object of the present invention is to provide an image processing method and apparatus performing novel functions.

Another object of the present invention is to provide an image processing method and apparatus adapted so as to be capable of processing image data effectively in a simple construction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram showing studio picture quality in an HDTV system, and distribution quality;

DESCRIPTION OF THE PREFERRED EMBODIMENT

A preferred embodiment of the present invention will now be described in detail with reference to the accompanying drawings.

Figure 1:
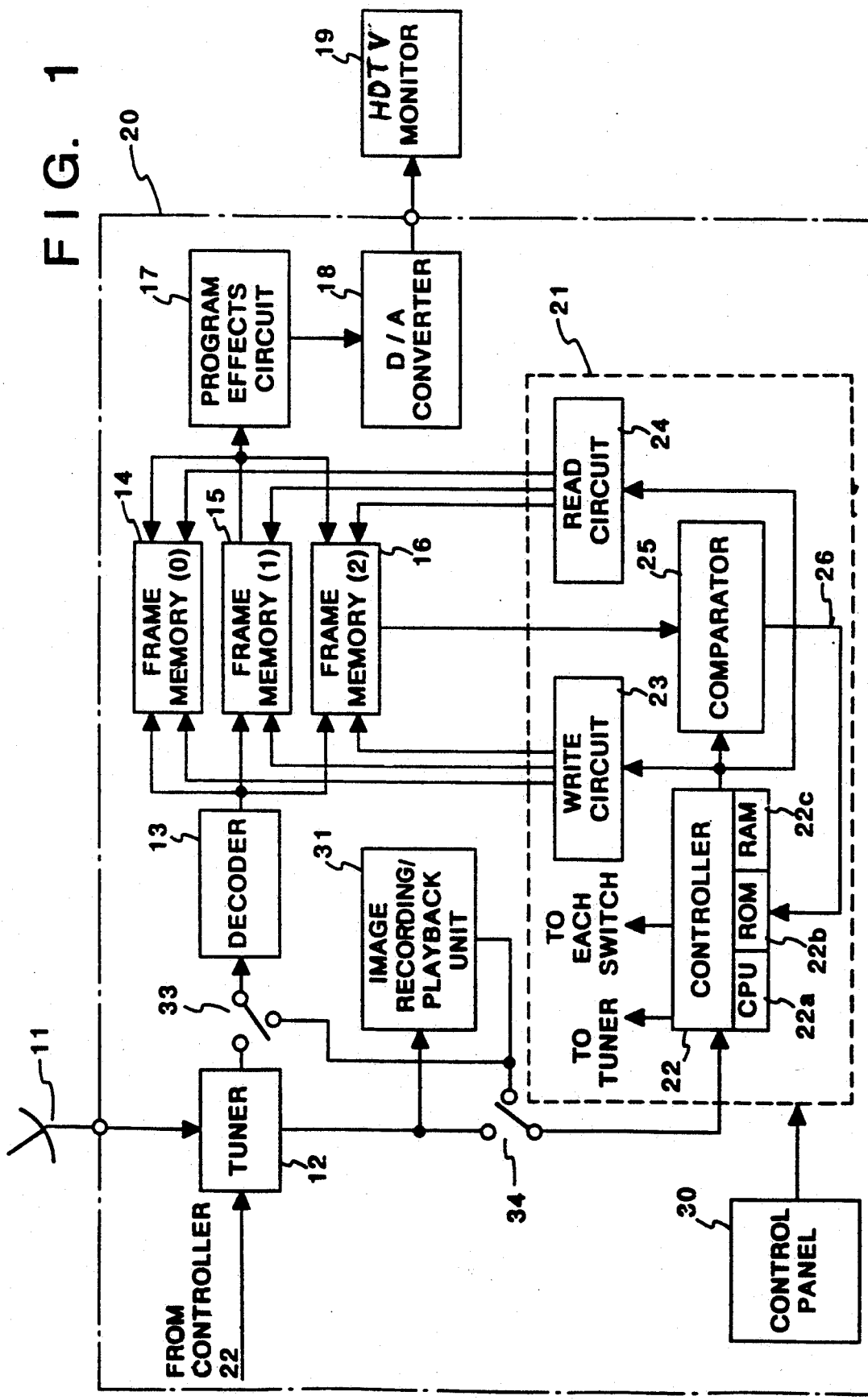
FIG. 1 is a block diagram illustrating the simplified construction of a still-picture playback apparatus according to an embodiment of the present invention.

FIG. 1 is a block diagram illustrating the simplified construction of a still-picture playback apparatus 20 according to an embodiment of the present invention.

As shown in FIG. 1, an antenna 11 which receives radio waves as transmitted by a broadcast satellite is connected to the still-picture playback apparatus 20 of the embodiment, which is an HDTV still-picture display apparatus. Also connected to the apparatus 20 is an HDTV color monitor 19 which displays an image composed of 1,125 scanning lines. The construction of the still-picture display apparatus 20 will now be described.

The still-picture display apparatus 20 includes a tuner 12 with separating means for separating the radio waves received by the antenna 11 into still-picture, digitally compressed data and image frame memory control data. If the frame memory control data c is transmitted as scrambled data with the digitally compressed data, the tuner 12 is capable of separating and extracting one item of data from the scrambled data. In addition, the tuner 12 is capable of changing the demodulated channel in response to a designation from the controller 22.

A decoding circuit 13 restores, to the original image data, the still-picture, digitally compressed data separated from the radio-wave signal by the tuner 12. The data is the result of bandwidth compression performed in accordance with a DPCM (differential pulse code modulation) method. Frame memories 14–16 are each capable of storing one frame of image data restored by the decoding circuit 13. These frame memories are assigned numbers of "0" through "2", respectively. A memory control unit 21 controls the writing and reading operations of the frame memories 14–16. A program effects circuit 17 is capable of producing various program effects such as scrolling and wiping by the frame memories 14–16. A D/A converter 18 converts the image data read from the program effects circuit 17 into analog data and delivers the analog data to the monitor 19, which displays the data.

The image signal from the tuner 12 enters a recording/playback unit 31, which is capable of recording the signal on a video tape or the like, playing back the signal and outputting the same. A switch 33 decides whether the image signal from the tuner 12 or from the recording/playback unit 31 is decoded by the decoder circuit 13. A switch 34 switches the image signal that enters the controller 22 between the image signal from the tuner 12 and the image signal from the recording/playback unit 31. A control panel 30 is manipulated by the operator to switch channels or to designate image playback from the recording/playback unit 31. The switches 33, 34 are changed over in response to a switch changeover signal outputted by the controller 22. It should be noted that the recording/playback unit 31 outputs the control data c and the digitally compressed image data separately.

The construction of the memory control unit 21 will now be described.

The memory control unit 21 includes a controller 22 for establishing correspondence between a write request frame memory number designated from the transmitting side by the control data, and a frame memory number of a memory actually read. The controller 22 has a CPU 22a such as a microprocessor, a ROM 22b storing the control program of the CPU 22a and various data, and a RAM 22c used as the working area of the CPU 22a. When a frame memory, among the frame memories 14–16, from which data is to be read is designated, a read circuit 24 reads the data from the designated frame memory. When a frame memory in which data is to be written is designated, a write circuit 23 writes the data in the designated frame memory. A comparator circuit 25 compares the write-request frame memory number and the read frame memory number and, when the two coincide, outputs a coincidence signal 26 to the controller 22. In response, the controller 22 inhibits writing of data in the frame memory designated by the write-request frame memory number and causes the input data to be written in a frame memory not currently being used in presenting a display. This is performed in accordance with the table values shown in FIG. 3, by way of example.

In the still-picture image display apparatus 20, the frame memory numbers "0", "1", "2" are assigned to the frame memories 14, 15, 16, respectively. When power is introduced to the apparatus, requested frame memory numbers and frame memory numbers of frames actually accessed are brought into correspondence in the state shown at 41 in FIG. 3 by means of the controller 22. As a result, in ordinary operation (i.e., when the requested frame memory number and the read frame memory number do not coincide), this state is maintained so long as the write-request frame memory number designated by the transmitting side and the frame memory number of the frame in which writing is actually carried out coincide and the same program continues to be received. Operation in this case is as illustrated in the flowchart of FIG. 4.

On the other hand, consider, by way of example, a case where the apparatus is in the above-described state and the viewer manipulates the control panel 30 to change the channel and thereby receive another program while the content of frame memory (0) is displayed following the writing of data in this frame memory. If the number of the write-request frame memory initially designated from the transmitting side was "0", then this means that the content of frame memory (0) 14 is currently being read out and displayed. Therefore, as a result of the channel changeover, the output of the comparator circuit 25 will indicate coincidence. Accordingly, in this case, correspondence is established between the requested frame memory number and that of the frame memory in which data is actually written, as illustrated at 42 in FIG. 3. As a result, in the case described above, when frame memory 14 (0) has been requested, frame memory 15 (1) is assigned and the transmitted image data is actually written in frame memory 15 (1).

Figure 5:
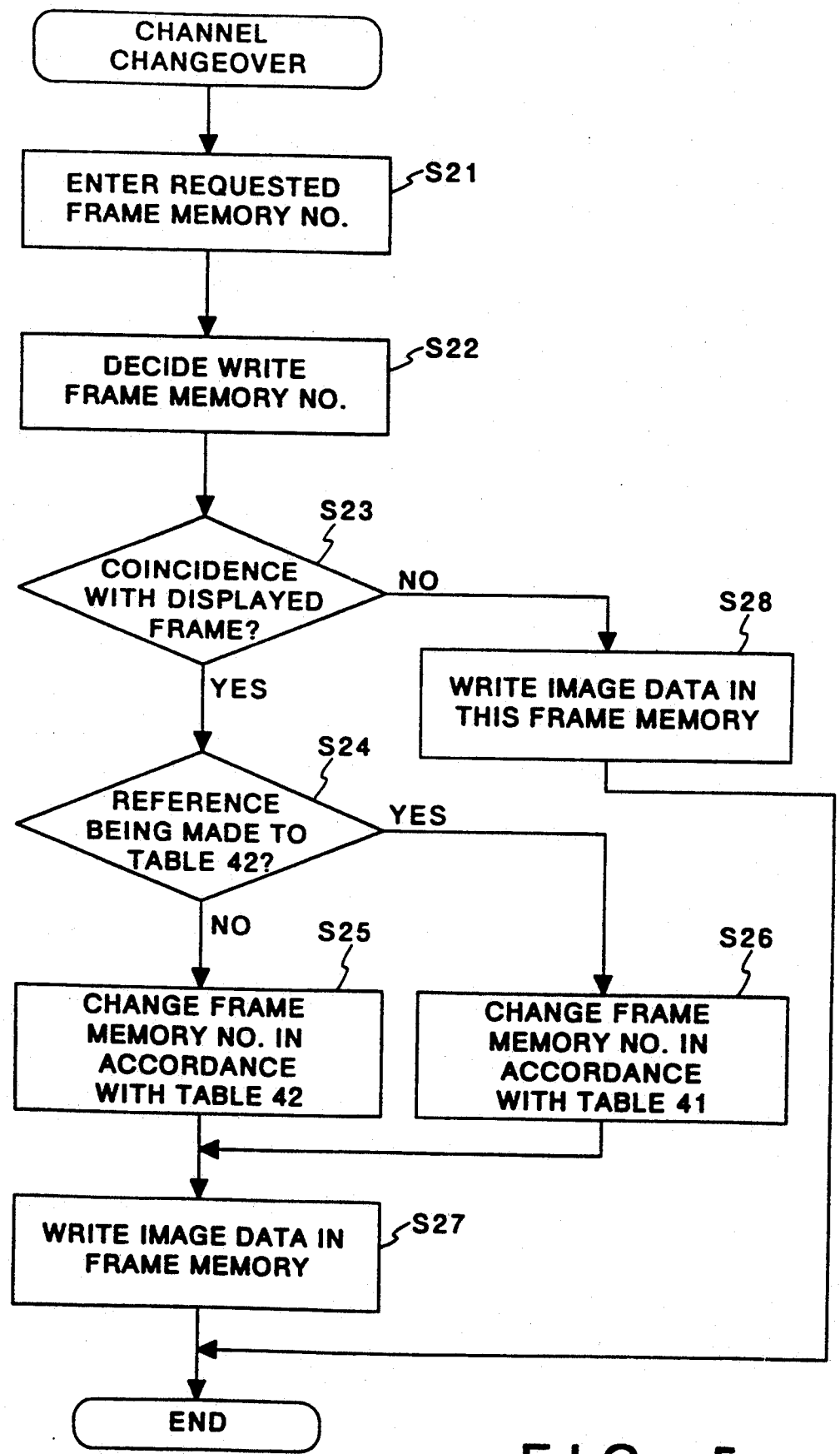
FIG. 5 is a flowchart showing image reception processing at the time of channel changeover in the still-picture playback apparatus of the embodiment.

In this case, the read circuit 24 reading the content of current frame memory (0) does not change the number of the frame memory being read as long as a display changeover command does not arrive. Thus the reading of the frame memory (0), namely the image frame memory 14 of FIG. 1, is continued. When the writing of data in the frame memory 15 of frame memory number (1) corresponding to the frame memory number (0) designated in this state ends and a changeover command for changing the frame memory number enters, the image data is read out of frame memory number (1), namely frame memory 15, by the read circuit 24, and this image data is displayed. The processing at this time is as shown in the flowchart of FIG. 5.

As a result of this processing, the content of the frame memory number whose data is currently being displayed is no longer rewritten by transmitted image data when the channel changeover is made. This makes it possible to prevent disturbance of the picture that might otherwise occur at channel changeover.

In the case described above, the controller 22 refers to the table 42 to effect a conversion to frame memory number (2) if the transmitting side has outputted a request for the writing of data in the frame memory number (1). Since the number of the frame memory being read is "1" at this point in time, coincidence is not detected by the memory-number comparator circuit 25, and the relationship between the frame memory number requested from the transmitting side and the frame memory number actually accessed remains as shown at 42 in FIG. 3.

Next, a case will be considered in which, during playback of data previously stored on a tape or the like, the writing of data in frame memory number (0) and frame memory number (1) is ended, data is read out of both of these memories (0) and (1) and, while scrolling is being performed by the program effects circuit 17, the viewer executes playback again in mid-course as by a rewinding operation.

Figure 6:
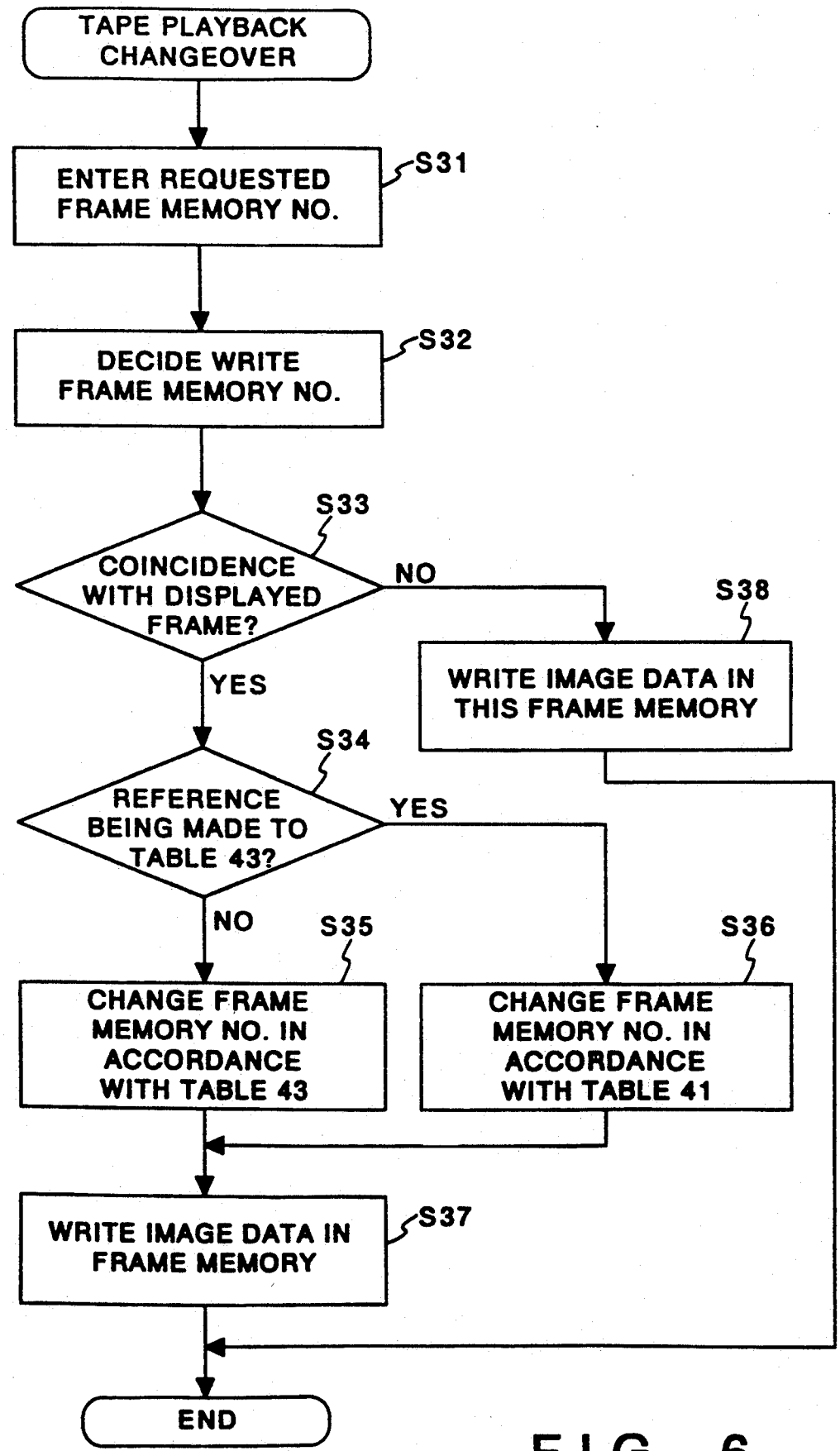
FIG. 6 is a flowchart showing image-data input processing at the time of playback tape changeover in the still-picture playback apparatus of the embodiment.

If the initial write-request frame memory number is "0", the memory-number comparator circuit 25 detects coincidence between the frame memory number (0) whose data is currently being displayed and the frame memory number being requested by the transmitting side. As a result, as illustrated by the flowchart of FIG. 6, the controller 22 establishes correspondence between the requested frame memory number of the frame memory number actually accessed, as illustrated at 43 in FIG. 3. Specifically, assume that the frame memory numbers 2, 0, 1 correspond to the requested frame memory numbers 0, 1, 2, respectively. Accordingly, when writing of data in frame memory (0) is designated when the content of frame memory 14 (0) is being displayed, the writing of the data in frame memory number (2), namely frame memory 16, is actually permitted.

As long as there is no display changeover command, the read circuit 24 continues the scrolling of frame memory numbers (0) and (1) without changing the frame memory number of the memory to be read. If, under these conditions, the writing of data in the frame memory number (2) (see 43 in FIG. 3) corresponding to the requested frame memory number (0) ends and a command for reading the frame memory number (0) enters, the read circuit 24 receives the requested frame memory number as an input and reads the frame memory number (2), namely frame memory 16, corresponding to the frame memory number (0). The data read from frame memory 16 is thus displayed.

Next, in a case where the transmitting side requests writing of data in the frame memory number (1), the requested frame memory number (1) is converted into the frame memory number (0) by the controller 22. Since the number of the frame memory being read is "2" at this point in time, the memory-number comparator 25 does not detect coincidence and the relationship between the requested frame memory number and the frame memory number actually accessed remains as shown at 43 in FIG. 3.

The flowchart of FIG. 6 illustrates processing, which is executed in response to tape playback changeover, for effecting the conversion from the requested frame memory number to the frame memory number of the frame memory in which the image data is actually written. This processing is substantially the same as that of the flowchart shown in FIG. 5. The only difference is that whereas tables 42 and 41 are referred to in the above-described channel-changeover processing, here reference is made to tables 43 and 41. Accordingly, the flowchart of FIG. 6 need not be described in detail.

Figure 3:
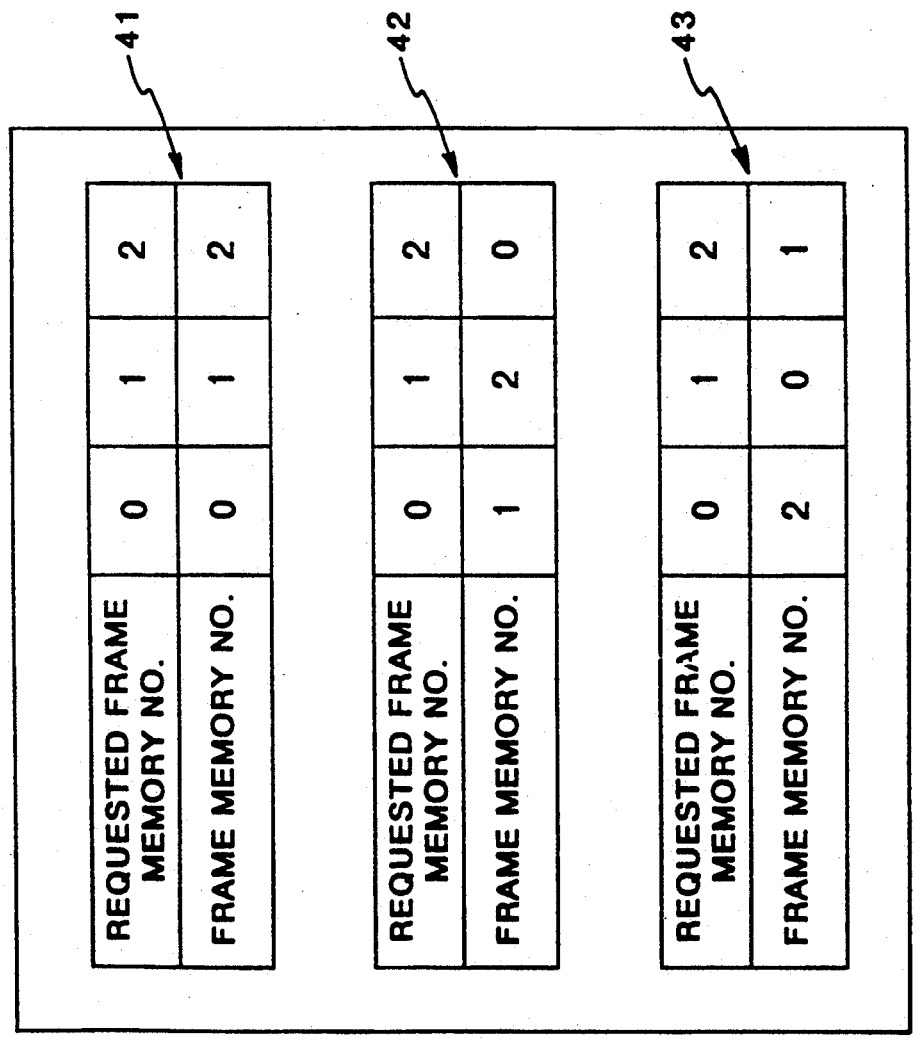
FIG. 3 is a diagram showing a comparison between requested frame memory numbers and frame memory numbers actually accessed.
Figure 4:
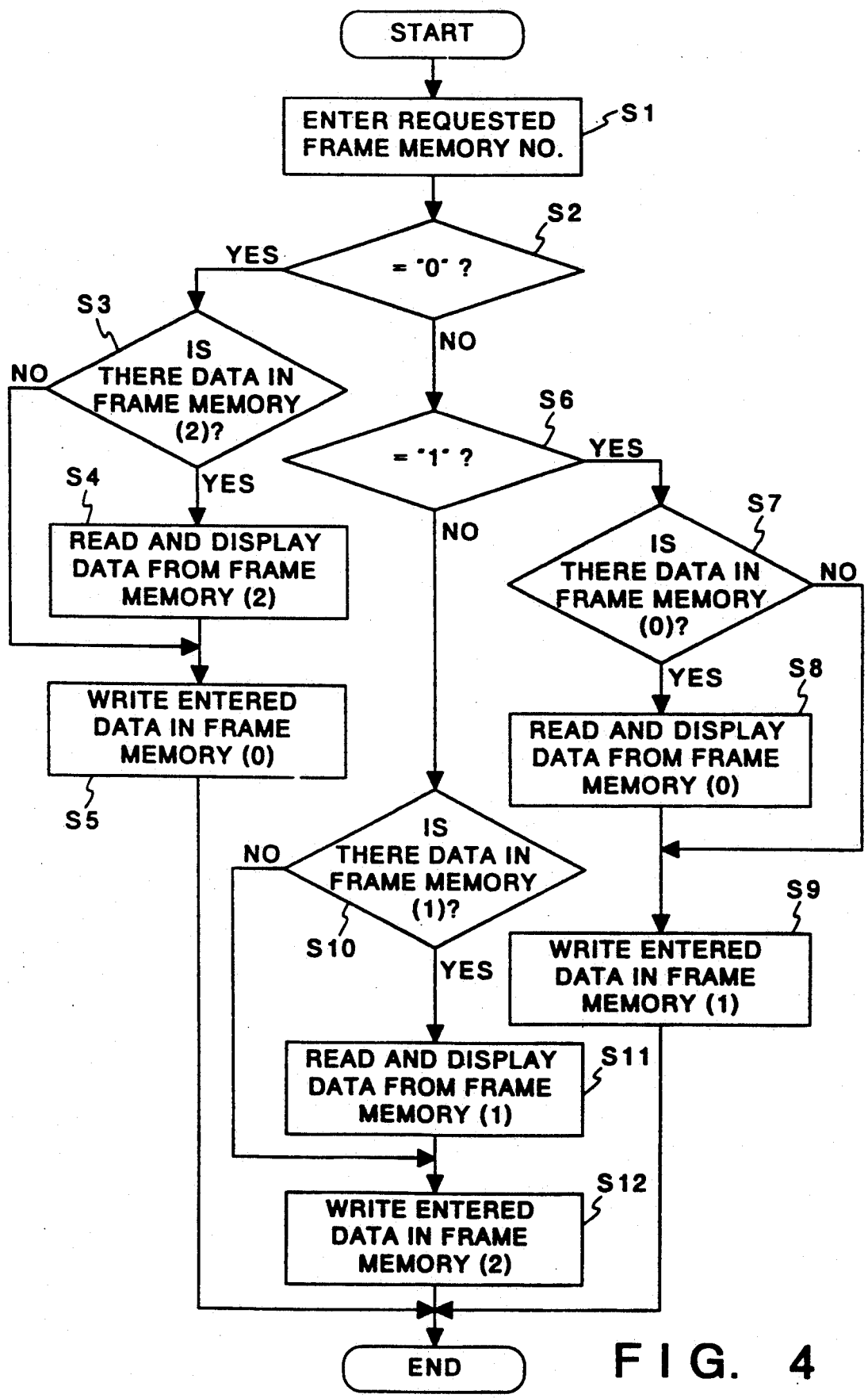
FIG. 4 is a flowchart showing standard image reception and display processing in the still-picture playback apparatus of the embodiment.

It should be noted that the data tables 41 through 43 illustrating the correlations shown in FIG. 3 are stored as tables in the ROM 22b.

FIGS. 4 through 6 are flowcharts showing the operation of the system controller 22 in the still-picture playback apparatus 20 of this embodiment. The programs for executing this processing are stored in the ROM 22b.

FIG. 4 is a flowchart illustrating control processing in the ordinary operating state, namely a case where a frame memory number designated by the control data c contained in the received image data does not coincide with the frame memory number of a frame memory whose stored data is currently being displayed.

First, the requested frame memory number is inputted from the transmitting side at step S1. Next, it is determined at step S2 whether the requested frame memory number is "0" or not. If the number is "0", then the program proceeds to step S3, at which it is determined whether there is data in the frame memory (2) updated immediately before. If the frame memory (2) does contain data, the data is read out by the read circuit 24 and displayed on the monitor 19. It should be noted that the operation for reading the frame memory is performed before the write command, and that the display operation has already been carried out. The received and decoded image data is written in the requested frame memory 14 (0) at step S5.

Thereafter, and in similar fashion, the program proceeds from step S6 to step S7 if the requested frame memory number is "1". The image data in the frame memory number (0) just updated, one ahead of the frame memory number (1), is displayed, and the received image data is written in the frame memory of the requested frame memory number (1). If the requested frame memory number is "2", the program proceeds from step S6 to step S10, the data in frame memory of frame memory number (1) is displayed, and the received image data is written in the frame memory number (2).

The foregoing illustrates ordinary operation, namely a case where the requested frame memory and the frame memory in which data is actually written coincide. In this case, the frame memory number in which data is written by the write circuit 23 and the frame memory number from which data is read by the read circuit 24 do not coincide, and therefore processing for examining the coincidence signal 26 from the comparator circuit 25 is not included in this flowchart.

FIG. 5 is a flowchart illustrating processing which accompanies the above described channel changeover processing. When channel changeover occurs, the program proceeds to step S21, where the write-request frame memory number is inputted along with the image data. When this is done, the number of the frame memory in which data is actually to be written is decided based upon the inputted number (step S22). This is decided depending upon which of the tables shown in FIG. 3 is currently being referred to in order to decide the frame memory number in which image data is to be written. Next, the program proceeds to step S23, at which it is determined whether the number of the frame memory thus decided, in which data is to be written, coincides with the number of the frame memory whose stored data is currently being displayed. In case of coincidence, the program proceeds to step S24, at which it is determined whether the re-quested frame memory number is being converted by refer-ring to table 42. If the answer is YES, the program proceeds to step S26, at which the requested frame memory number is converted, in accordance with table 41 in FIG. 3, into the frame memory number in which data is actually to be written. As a result, the received image data is written in the frame memory indicated by the frame memory number inputted at step S21.

If it is found at step S24 that the frame memory number has not been decided in accordance with table 42, the program proceeds to step S25, at which the frame memory number in which the image data is actually written is decided in accordance with the contents of table 42. When the frame memory number in which the received image data is written is thus decided, the program proceeds to step S27, at which the image data is written in the frame memory decided at step S25 or step S26.

When it is found at step S23 that the frame memory number in which the image data decided at step S22 is to be written does not coincide with the frame memory number whose stored data is presently being displayed, the program proceeds to step S28, at which the received image data is written in the frame memory decided at step S22.

As a result, if frame number "2" is requested when the content of the frame memory number "2", for example, is being displayed, reference is had to table 42, the number of the frame memory in which image data is actually to be written is made "0", and the received data is written in the frame memory 14 (0). If, when the frame memory number in which the image data is to be written has been decided by referring to table 42, the number of the frame memory whose data is presently being displayed coincides with the frame memory number determined, by reference to table 42, to be that in which data is to be written, then the number of the frame memory which stores this received image data is again decided based upon the contents of table 41. Here the switch 34 has been changed over to the side of tuner 12.

FIG. 6 is a flowchart showing the processing executed by the controller 22 at changeover to tape playback. This processing, which is started by switching to tape playback in response to operation of the control panel 30, is substantially the same as that of the flowchart show in FIG. 5. The only difference is that whereas tables 42 and 41 are referred to in the above-described channel-changeover processing, here reference is made to tables 43 and 41. Accordingly, the flowchart of FIG. 6 need not be described in detail.

As a result, if, by way of example, writing of data in frame memory number (2) is designated when the data in frame memory number (2) is being read and displayed, the writing of data in the frame memory number (1) 15 is actually designated in accordance with table 43 in FIG. 3. The ensuing operation is similar to that of channel changeover. Specifically, if, when the frame memory number in which the image data is to be written has been decided by referring to table 43, the number of the frame memory whose data is presently being displayed coincides with the frame memory number determined, by reference to table 43, to be that in which data is to be written, then the number of the frame memory which stores this received image data is again decided based upon the contents of table 41. Here the switch 34 has been changed over to the side of the recording/playback unit 31.

Thus, in accordance with this embodiment, as described above, in a case where one program is being received from a plurality of transmitting sides and the program is changed over to that from another transmitting side, as by operating a channel switch, during the aforementioned reception, or in a case where already stored transmission data is in the process of being played back and, during this playback, an image is replayed in mid-course as by rewinding a tape, an unacttractive display, as caused by disturbance of the displayed picture, can be prevented even if the writing of new image information in the frame memory whose stored data is currently being displayed is designated.

Though the three memory number of 0, 1, 2 are used in the illustrated embodiment, it goes without saying that any number of frame memory numbers of two or more can be used.

The present invention is not limited to the preferred embodiments, it is possible to adapt to other image display systems such as video telephone and video conference.

The present invention can be adapted to a system with a plurality of devices or an apparatus composed of a device. It goes without saying that the present invention is applicable to a system or an apparatus supplied with a software program to perform a function defined by the present invention.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   a plurality of image memories each capable of storing at least one picture of image information;
   input means for receiving image information including first memory indicative information that indicates in which memory the image information is to be stored;
   reading means for successively reading out image information from the plurality of image memories;
   means for outputting image information from said reading means;
   comparing means for comparing the first memory indicative information received by said input means with second memory indicative information which indicates which of the image memories is being read by said reading means; and
   control means for changing the first memory indicative information received by said input means according to a result of comparison by said comparing means, to store the received image information in another of the image memories indicated by the changed first memory indicative information.

2. The apparatus according to claim 1, further comprising:
   storage means for establishing correspondence between, and storing, a first memory number of the image memory indicated by said first memory indicative information and memory numbers of image memories in which said image information will be written;
   wherein said control means, when the first memory indicative information and the second memory indicative information are determined by said comparing means to coincide, controls the apparatus such that the first memory number is changed in accordance with memory numbers stored in said storage means to correspond to a changed memory number, and said image information is stored in the image memory having the changed memory number.

3. The apparatus according to claim 2, wherein said storage means stores a plurality of memory numbers to be designated by said first memory indicative information, and said control means changes the memory number designated by said first memory indicative information in conformity with a change in a receiving state of the apparatus, and writes said image information in the indicated image memory.

4. An image processing apparatus comprising:
   a plurality of image memories each capable of storing at least one picture of still-image data;
   input means for receiving still-image information including still-image data and memory indicative information that indicates an image memory in which the received still-image data is to be stored;
   reading means or successively reading still-image data from said plurality of image memories;
   means for outputting the read still-image data from said reading means;
   comparing means for comparing said memory indicative information from said input means with memory identification data of an image memory being read by said reading means;
   writing means for writing said received still-image data in the image memory designated by said memory indicative information; and
   control means for controlling said apparatus so as to inhibit writing by said writing means when the memory indicative information and said memory identification data compared by said comparing means coincide, and to permit writing of said still-image data by said writing means in an image memory whose memory identification data differs from the memory indicative information.

5. A still-image playback apparatus comprising:
   a plurality of image memories each capable of storing at least one frame of still-image data;
   input means for receiving still-image information including still-image data and memory indicative data that indicates in which image memory the still-image data is to be stored;
   reading means for successively reading still-image data from said plurality of image memories;
   playback means for reproducing the still-image data from said reading means;
   comparing means for comparing the memory indicative data with memory identification data of an image memory being read by said reading means;
   storage means for establishing correspondence between, and storing, memory identification data of the image memory indicated by said memory indicative data and memory identification data of an image memory in which said received still-image data actually will be written; and
   control means for controlling said apparatus, in dependence upon results of comparison performed by said comparing means, so as to read out, from said storage means, memory identification data corresponding to the memory indicative data, and to write said received still-image data in the image memory having the memory identification data that has been read out.

6. The apparatus according to claim 5, wherein said storage means has plural sets of correlated data, and said control means selects plural sets of memory identification data from said storage means in dependence upon the operating state of the apparatus, and reads out the memory identification data corresponding to the memory indicative data.

7. The apparatus according to claim 6, wherein said operating state includes a channel changeover operation of the apparatus or a video playback operation of the apparatus.

8. A still-image playback apparatus, comprising:
   receiving means for receiving image information, which includes control data, and separating it into an image signal and the control data;

decoding means for decoding the image signal separated by said receiving means and for converting it to image data;

a plurality of frame memories having respective numbers and each for storing the image data converted by said decoding means, said control data designating a number of one of said frame memories;

reading means for successively reading image data from said plurality of image memories;

display means for displaying the image data read out by said reading means;

writing means for writing the image data, which has been converted by said decoding means, in whichever of said frame memories has had its number designated by said control data;

comparing means for comparing the number of a frame memory from which the image data has been read by said reading means with the number designated by said control data; and control means for controlling said apparatus, when the number designated by said control data and the number of the frame memory from which the image data has been read by said reading means are the same, so as to inhibit writing of the image data by said writing means in the frame memory whose number has been designated by the control data and to permit writing of said image data by said writing means in a frame memory whose number differs from the number designated by said control data.

9. The apparatus according to claim 8, further comprising storage means for establishing correspondence between, and storing, the number designated by said control data and a number of a frame memory in which said image data actually will be written;

wherein said control means determines said frame memory into which writing is permitted by referring to numbers stored in said storage means.

10. A still-image playback apparatus comprising:

input means, to which is inputted a video signal from an image playback unit, for separating the video signal into an image portion and control data contained in the video signal;

decoding means for decoding the image portion separated by said input means and for converting the image portion into image data;

a plurality of frame memories each having a number and for storing the image data converted by said decoding means, said control data designating a number of one of said frame memories;

reading means for successively reading image data from said plurality of frame memories;

display means for displaying the image data read out by said reading means;

writing means for writing the image data, which has been converted by said decoding means, in whichever of said frame memories has had its number designated by said control data;

comparing means for comparing the number of a frame memory from which the image data has been read by said reading means with the number designated by said control data; and control means for controlling said apparatus, when the number designated by said control data and the number of the frame memory from which the image data has been read by said reading means are the same, so as to inhibit writing of the image data by said writing means in the frame memory whose number has been designated by the control data and to permit writing of said image data by said writing means in a frame memory whose number differs from the number designated by said control data.

11. The apparatus according to claim 10, further comprising storage means for establishing correspondence between, and storing, the number designated by said control data and a number of a frame memory in which said image data actually will be written;

wherein said control means determines said frame memory in which writing is permitted by referring to numbers stored in said storage means.

12. A still-image playback apparatus comprising:

receiving means for receiving image information, which includes control data, and separating it into an image signal and the control data;

input means, to which is inputted a video signal from an image playback unit, for separating the video signal into an image signal and control data;

selecting means for selecting the image signal and the control data from either said receiving means or said input means;

decoding means for decoding the image signal selected by said selecting means and for converting it into image data;

a plurality of frame memories each having a number and for storing the image data converted by said decoding means, the control data selected by said selecting means designating a number of one of said frame memories;

reading means for successively reading image data form said plurality of image memories;

display means for displaying the image data read out by said reading means;

writing means for writing the image data, which has been decoded by said decoding means, in whichever of said frame memories has had its number designated by said control data selected by said selecting means;

comparing means for comparing the number of a frame memory from which the image data has been read by said reading means with the number designated by said control data; and control means for controlling said apparatus, when the number designated by said control data and the number of the frame memory from which the image data has been read by said reading means are the same, so as to inhibit writing of the image data by said writing means in the frame memory whose number has been designated by the control data and to permit writing of said image data by said writing means in a frame memory whose number differs from the number designated by said control data.

13. The apparatus according to claim 12, further comprising storage means for establishing correspondence between, and storing, the number designated by the control data from said receiving means or said input means and a number of a frame memory in which said image data actually will be written, these numbers being stored for said receiving means and said input means, respectively;

wherein said control means determines said frame memory into which writing is permitted by referring to the number stored in said storage means.

14. A still-image playback method for displaying a received still-image signal upon storing the still-image signal in any of a plurality of frame memories each having a frame memory number, comprising the steps of:

receiving the image signal, which includes control data, and separating it into image data and the control data, said control data including memory indicative data that indicates a frame memory in which the image data is to be stored;

reading image data from one of the plurality of frame memories and displaying the read image data on a monitor;

comparing a frame memory number of whichever of the plurality of frame memories is designated by the control data with a frame memory number of which ever of the plurality of frame memories is currently being accessed in said reading step; and storing the image data into a different one of the plurality of frame memories from the one which is designated by said control data, if the frame memory designated by said control data and the frame memory from which the image data has been read by said reading step are the same.

* * * * *

UNITED STATES PATENT AND TRADEMARK OFFICE
CERTIFICATE OF CORRECTION

PATENT NO. : 5,220,425
DATED : June 15, 1993
INVENTOR(S) : MASAHIKO ENARI, ET AL.

It is certified that error appears in the above-indentified patent and that said Letters Patent is hereby corrected as shown below:

<ins>IN THE DRAWINGS</ins>

<ins>SHEET 2 OF 6</ins>

FIG. 2, "DESTRIBUTION" should read --DISTRIBUTION--.

<ins>COLUMN 1</ins>

Line 37, "HDTV type" should read --HDTV-type--.
Line 46, "case" should read --the case--.

<ins>COLUMN 2</ins>

Line 13, "system," should read --systems,--.

<ins>COLUMN 3</ins>

Line 12, "Other" should read --Another--.

<ins>COLUMN 4</ins>

Line 40, "write re-" should read --write-re- --.

<ins>COLUMN 7</ins>

Line 34, "above described" should read --above-described--.
Line 50, "re-quested" should read --requested--.
Line 51, "refer-ring" should read --referring--.

<ins>COLUMN 8</ins>

Line 60, "unact-" should read --unat- --.
Line 65, "number" should read --numbers--.

UNITED STATES PATENT AND TRADEMARK OFFICE
CERTIFICATE OF CORRECTION

PATENT NO. : 5,220,425
DATED : June 15, 1993
INVENTOR(S) : MASAHIKO ENARI, ET AL.

It is certified that error appears in the above-indentified patent and that said Letters Patent is hereby corrected as shown below:

<u>COLUMN 9</u>

Line 2, "it" should read --and it--.

<u>COLUMN 10</u>

Line 5, "or" should read --for--.

<u>COLUMN 11</u>

Line 13, "which" should read --which- --.

<u>COLUMN 14</u>

Line 4, "which ever" should read --whichever--.

Signed and Sealed this

Eighth Day of March, 1994

BRUCE LEHMAN

Attest:

Attesting Officer

Commissioner of Patents and Trademarks